May 9, 1961 J. N. HERRINGTON 2,983,233
CUTTER SLEEVES FOR DOUGHNUT MAKING MACHINES
Filed Nov. 14, 1958 2 Sheets-Sheet 1

INVENTOR
JOHN N. HERRINGTON,
BY Philip E. Siggers
ATTORNEY

May 9, 1961  J. N. HERRINGTON  2,983,233
CUTTER SLEEVES FOR DOUGHNUT MAKING MACHINES
Filed Nov. 14, 1958  2 Sheets-Sheet 2
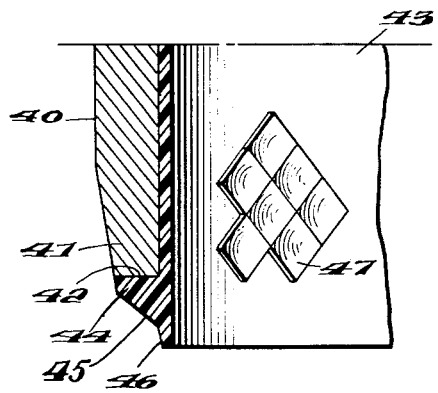
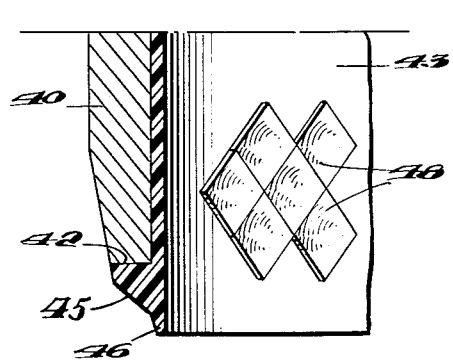
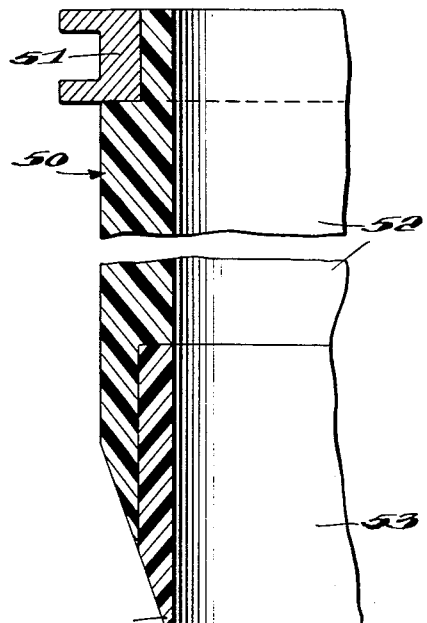
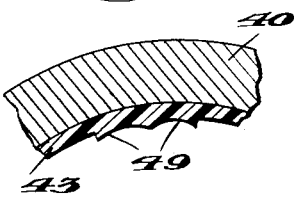
INVENTOR
JOHN N. HERRINGTON,
BY Philip E. Siggers
ATTORNEY United States Patent Office 2,983,233
Patented May 9, 1961

2,983,233
CUTTER SLEEVES FOR DOUGHNUT MAKING MACHINES

John N. Herrington, 302 Philadelphia Pike, Wilmington, Del., assignor to Chace D. Gilmore, West Chester, Pa.

Filed Nov. 14, 1958, Ser. No. 773,951
14 Claims. (Cl. 107—14)

This invention relates to die attachments for doughnut making machines and particularly to improvements in the cutter sleeves for such machines.

As is well known in the prior art, many doughnut-making machines form the doughnut shapes by forcing dough through vertical cylindrical tubes, often called die tubes, over which cutter sleeves are reciprocated by power, the lower edges of the cutter sleeves having knives which cut off the dough shapes when they move into contact with fixed disks. These disks are supported on the die tubes but are spaced from the lower edges thereof to form an extrusion opening. An example of such a machine is shown in the Bergner Patent No. 1,492,542.

Machines of the described type work satisfactorily when the die parts have not been damaged, are in perfect adjustment and are supplied with a good grade of dough mix. But frequently after some weeks or months of operation, difficulties arise due to damage to or wear of the metal parts. The knife edges particularly are likely to be damaged, as the hot dies are not infrequently dropped by unskilled workmen. When considerable wear or damage has occurred, stringing or dripping of the dough from the mouth of the die will be observed. Sometimes a dough string will hold a dough shape suspended from the end of the die tube; meanwhile, another dough shape has been formed by the machine and is piled or massed on top of the still hanging dough shape. Nearly always the strings and gobs of dough will fall into the kettle of hot liquid fat directly below the die, and will quickly fry to blackness. This darkens the entire batch of fat, which presently becomes unusable. The machine must then be shut down and the dark fat must be filtered to remove the carbon particles, or it must be discarded. The machine operator must also remove the defective die assembly and return it to the doughnut machine factory for reconditioning. The cost of this is considerable: not only the reconditioning charge made by the factory but the far more serious money loss due to stopping production and putting a new or reconditioned die assembly on the machine to replace the one removed.

The present invention provides a simple cutter sleeve construction which will lower the cost of operating machines of the character described, and will increase production by minimizing shutdowns due to the described difficulties. These are the advantages and hence the broad objects of the invention described herein. More specific objects will be pointed out in the following description, or will be obvious to those skilled in the art.

Referring to the accompanying drawings forming a part of this specification,

Fig. 5 is a view like Figs. 3 and 4 but showing another form of cutter sleeve having an inner elastomeric lining bonded to it provided with an embossed surface;

Fig. 6 is a view like Fig. 5 except the embossed design is somewhat different;

Fig. 7 is a view like Figs. 5 and 6 but showing a different embossed design;

Fig. 8 is a fragmentary section through still another form of cutter sleeve made principally of two elastomeric segments bonded to each other; and Fig. 9 is a detail cross section on line 9—9 of Fig. 7.

Figure 1:
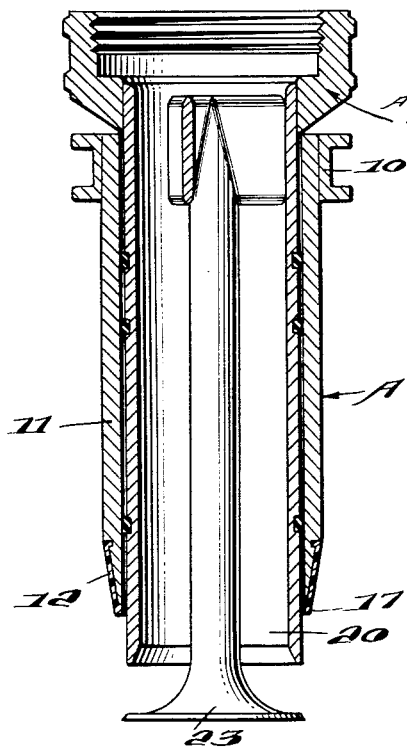
Fig. 1 is a longitudinal section through the improved die assembly, showing the cutter sleeve in an elevated position.
Figure 2:
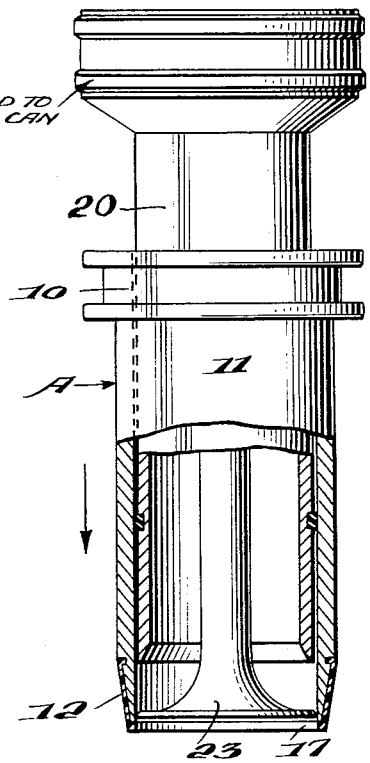
Fig. 2 is a sectional elevation of the same showing the cutter sleeve in its lowermost or dough-cutting position.

Referring particularly to the drawings, and first to Figs. 1 and 2, the cutter sleeve A includes a grooved steel ring 10, a steel sleeve 11, which is cylindrical and rigidly fixed to the steel ring as by shrink-fitting, and a snap-on elastomeric ring 12 resiliently locked on the lower end of sleeve 11 to provide a flexible, removable cutting edge. Ring 12 may be of Buna N artificial rubber. The lower end of sleeve 11 has a circular groove 13 milled in it and below the groove 13 the sleeve is beveled as at 14 and tapers to an edge 15. The elastomeric ring 12 has an internal circular rib or flange 16 which fits and resiliently locks in groove 13, preventing the ring from falling or being pulled off the sleeve except by deliberate manipulation. The intermediate section of elastomeric ring 12 is beveled to conform to and lie flat against the beveled surface 14, the resilience of said ring causing a tight hugging of the sleeve. At its lower extremity, ring 12 is somewhat thicker and covers and projects below sleeve edge 15 to provide the somewhat flexible dough-cutting edge 17 which my invention seeks to provide. The described elastomeric ring may be placed on the sleeve by hand and may be removed by stretching it with the fingers, no special tools being required.

As shown in Figs. 1 and 2, the cutter sleeve A reciprocates over the die tube 20 which is fixed to the bottom of the dough can (not shown) of the doughnut-making machine. A yoke (not shown) is rocked by power to effect such reciprocation. A disk 23 is fixed to die tube 20 and is spaced from the lower end thereof to provide an extrusion opening for the dough. The cutting edge 17 contacts the disk 23 to cut off the dough shape which then falls into the kettle of hot fat (not shown) that is below the die assembly of Figs. 1 and 2. The flexibility of the cutting edge is highly effective to obviate stringing and dripping of the dough, as it cannot be damaged by ordinary usage or carelessness; furthermore the elastomeric edge 17 wears even better than steel.

Figure 3:
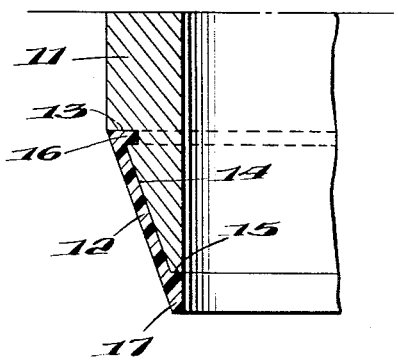
Fig. 3 is a fragmentary sectional view, on an enlarged scale, showing an elastomeric ring mounted on the lower end of the cutter sleeve of Figs. 1 and 2.
Figure 4:
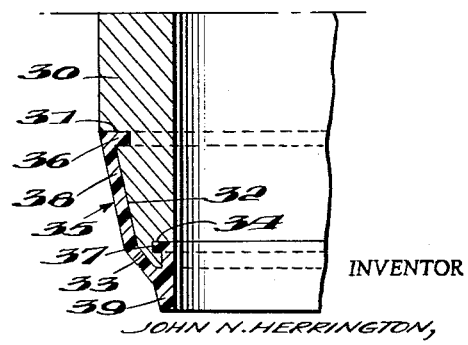
Fig. 4 is a view like Fig. 3 but showing a modified form of elastomeric ring mounted on a modified cutter sleeve.

The embodiment of the invention shown in Fig. 4 is very similar to the form of Figs. 1, 2 and 3. Here the steel cutter sleeve 30 has a circular groove 31 milled in its outer wall near its lower end, and also has a beveled surface 32 below groove 31, a narrower beveled surface 33 below surface 32, and an internal circular groove 34 spaced slightly above the lower extremity. An elastomeric ring 35 has a rib or flange 36 which fits in groove 31 and another rib or flange 37 in a lower horizontal plane which fits in groove 34. The intermediate portion 38 of ring 35 is shaped to hug or conform to the beveled surfaces 32, 33, while the lower extremity 39 (the "knife" edge) is a circular projection of sufficient flexibility to obviate the stringing or dripping previously mentioned. The lower edge 39 is more massive than the edge 16 of the previously described form, but its flexibility may be about the same. By the provision of two locking flanges 36, 37, ring 35 is more securely locked in place than is ring 12, yet ring 35 may be removed manually as it also stretches circumferentially.

In the third embodiment of the invention, shown in Figs. 5, 6, 7 and 9, the steel cutter sleeve 40 has a beveled lower end 41 with its extremity squared off as at 42. An elastomeric lining 43 is bonded to the entire interior surface of sleeve 40 and has its lower end made sufficiently massive to have a shoulder 44 which is bonded to the sleeve end 42. The lower extremity of lining 43 is tapered as at 45 to provide a flexible dough-cutting edge 46, in accordance with the invention. The lining 43 may be of Buna N or other tough somewhat flexible artificial rubber or elastomer.

Inasmuch as the sliding friction of Buna N or the like on the steel surface of the die tube is considerable, I desire to minimize this friction in two ways. First, I provide on the interior surface of the lining an embossed design, such as the diamond design 47 of Fig. 5, or the square design 48 of Fig. 6, or the honeycomb design 49 of Fig. 7, or any equivalent design providing a multiplicity of ridges and pockets. The ridges of each design are about 0.005 in. high, and the tops of these ridges make the only contact with the outer surface of the die tube. As the total area of the contacting surfaces is only a small fraction of the total area of the lining 43, sliding friction of the cutter sleeve over the die tube is greatly reduced. Second, I propose to lubricate the surfaces of the lining 43 and the die tube with the edible oil or fat which is used to fry the doughnuts. This may be accomplished in several ways, one of which is disclosed in the Chace D. Gilmore Patent No. 2,915,992, dated December 8, 1959. According to this Gilmore patent, the edible oil is pumped intermittently to the die assembly and flows down as a film between the die tube and the cutter sleeve. With this arrangement, the edible oil will collect in the pockets formed in the embossed design (whatever it is) and will spread as a film over the stationary die tube, which will also aid in reducing the friction of the sliding cutter sleeve, and of course will reduce wear of the lining and the surfaces contacting it.

The fourth form of my invention is shown in Fig. 8. In this embodiment the steel cutter sleeve is dispensed with and the entire cutter sleeve 50 is a molded elastomeric body, except the grooved steel ring 51 which is conventional, being engaged by the oscillating yoke previously mentioned. Sleeve 50 is bonded to the inside surface and lower face of ring 51 to make a rigid semi-permanent assembly. The inner surface of sleeve 50 preferably has an embossed design, shown only in Figs. 5, 6 and 7, for the reasons explained above. To give the desired flexibility to the lower edge and yet provide a sufficiently rigid sleeve body, the cutter sleeve 50 is made from two different elastomeric bodies or segments, a relatively hard, unyielding shell or cylinder 52 and a more flexible shell or cylinder 53 inside cylinder 52, with the lower extremity of cylinder 53 forming a slightly yielding dough cutting edge 54. These two cylinders may be of Buna N of different specifications, bonded together, with the lower extremity 54 projecting below the lower end of cylinder 52 to afford the differential flexibility of the cutter sleeve which is attained, in a different way, in the three forms described previously.

All four forms of cutter sleeve have a rigid or relatively rigid cylindrical body and a somewhat flexible elastomeric lower edge which contacts the disk attached to the die tube to cut the dough shape to permit it to fall into the hot fat below. All four forms are so made as to overcome the operating difficulties mentioned above. The flexibility of each knife or cutting edge is so controlled that while the edge flexes sufficiently to prevent stringing or dripping of the dough, it will yet have sufficient stiffness to cut the dough shape. Buna N can be made to perform this dual function.

Obviously the four embodiments described herein are merely illustrative and other embodiments may be devised within the scope of the appended claims.

What I claim is:

1. A cutter sleeve for the die of a doughnut-making machine of the type employing a fixed dough-delivering die tube, a disk fixed to and spaced from the lower end of the die tube, and a power-reciprocated cutter sleeve moved over the die tube into contact with the disk to cut off the dough extruded from the die tube; said cutter sleeve having a cylindrical form and a somewhat flexible elastomeric lower edge which contacts the disk to cut the dough shape.

2. The invention defined in claim 1, wherein the cutter sleeve is made of metal and has its lower end of reduced wall thickness; and the somewhat flexible elastomeric lower edge is provided by an elastomeric body secured to said lower end, said lower edge being circular and being adapted to cut the dough shape in co-operation with said disk.

3. The invention defined in claim 2, wherein the elastomeric body is a ring which is held on said lower end by its own resilience and by interengaging surfaces on the ring and said lower end; said ring being manually removable.

4. The invention defined in claim 3, wherein said lower end has a groove formed in it and extending all around, and the elastomeric ring has an inwardly projecting flange which fits in said groove to aid in locking the ring on said lower end.

5. The invention defined in claim 4, wherein said lower end has a groove formed in the outside wall and another groove formed in the inside wall, both grooves being circular and lying in different horizontal planes; the elastomeric ring having complemental flanges fitting in said grooves.

6. The invention defined in claim 1, wherein the cutter sleeve is of metal and an elastomeric lining is bonded to the inner cylindrical surface of said sleeve; the lower end of said elastomeric lining being of greater thickness than the principal part of the lining and said lower end being bonded to and lying below the lower edge of said sleeve and having at its lower extremity a somewhat flexible cutting edge of sufficient thinness to effect cutting of the dough shape.

7. The invention defined in claim 6, wherein the entire inner surface of said bonded lining has an embossed design formed on it providing a multiplicity of raised ridges which form a multiplicity of pockets for lubricating oil and which minimize sliding friction of the cutter sleeve with which they are in contact.

8. The invention defined in claim 7, wherein said embossed design has ridges about 0.005 inch high and forming a honeycomb design.

9. The invention defined in claim 7, wherein said embossed design has ridges about 0.005 inch high and forming a multiplicity of connected diamond-shaped figures.

10. The invention defined in claim 7 wherein said embossed design has ridges about 0.005 inch high and forming a multiplicity of connected quadrilateral figures.

11. The invention defined in claim 1, wherein the cutter sleeve has a metallic grooved ring adapted to be engaged by the rocking yoke of the doughnut-making machine; and a cylindrical elastomeric body is rigidly secured to said grooved ring on the inside thereof so as to form therewith a unitary sleeve which is reciprocable by said yoke; the lower end of said elastomeric body providing said somewhat flexible elastomeric dough-cutting edge.

12. The invention defined in claim 1, wherein the cutter sleeve has a metallic ring adapted to be engaged by power-operated mechanism to reciprocate the cutter sleeve; and a cylindrical elastomeric body is rigidly secured to said metallic ring; said cylindrical elastomeric body comprising an outer stiff shell rigidly bonded to the inner periphery of said ring, and an inner flexible shell which is bonded to the inside of the outer shell and extends below the lower end of the outer shell to provide a somewhat flexible dough-cutting edge.

13. The invention defined in claim 1, wherein the cutter sleeve has a metallic grooved ring at its upper end adapted to be engaged by the rocking yoke of the doughnut-making machine; the main body of the cutter sleeve being of elastomeric material bonded to the inner surface of said grooved ring so as to form therewith a unitary reciprocable member which is moved by the yoke over said die tube into contact with said disk to cut off the dough shape; the lower edges of said elastomeric cutter sleeve having sufficient flexibility to obviate stringing of the dough.

14. The invention defined in claim 13, wherein the cutter sleeve comprises two cylindrical shells bonded together, one shell being relatively hard and unyielding, the other shell being inside the first mentioned shell and projecting below the lower end of the first mentioned shell and being relatively flexible to provide a somewhat yielding dough-cutting edge.

References Cited in the file of this patent

UNITED STATES PATENTS

| | | |
|---|---|---|
| 799,928 | Nehr | Sept. 19, 1905 |
| 1,329,586 | Dragon | Feb. 3, 1920 |
| 1,956,587 | Parker et al. | May 1, 1934 |
| 1,964,699 | Wikstrom | June 26, 1934 |
| 2,403,476 | Berry et al. | July 9, 1946 |
| 2,506,802 | Magnuson et al. | May 9, 1950 |
| 2,635,560 | Coyne | Apr. 21, 1953 |
| 2,794,405 | Vogt | June 4, 1957 |